(12) United States Patent
Chu et al.

(10) Patent No.: US 10,723,893 B2
(45) Date of Patent: Jul. 28, 2020

(54) COMPOSITE STRUCTURE

(71) Applicant: INDUSTRIAL TECHNOLOGY RESEARCH INSTITUTE, Hsinchu (TW)

(72) Inventors: Jen-You Chu, Hsinchu (TW); Chia-Le Wu, Taoyuan (TW); Feng-Sheng Kao, Hsinchu (TW); Chin-Ping Huang, Hsinchu (TW); Yi-Chun Chen, Hsinchu (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 0 days.

(21) Appl. No.: 15/914,620

(22) Filed: Mar. 7, 2018

(65) Prior Publication Data

US 2018/0258295 A1    Sep. 13, 2018

Related U.S. Application Data

(60) Provisional application No. 62/468,525, filed on Mar. 8, 2017.

(30) Foreign Application Priority Data

Dec. 25, 2017   (TW) .............................. 106145516 A

(51) Int. Cl.
*B32B 27/14* (2006.01)
*C09D 5/16* (2006.01)
(Continued)

(52) U.S. Cl.
CPC ............ *C09D 5/1637* (2013.01); *B32B 27/14* (2013.01); *B32B 27/281* (2013.01);
(Continued)

(58) Field of Classification Search
None
See application file for complete search history.

(56) References Cited

U.S. PATENT DOCUMENTS 8,011,517 B2 *  9/2011  Allen .................... B01D 65/08
                                                              210/490
9,302,922 B2    4/2016  Diallo et al.
(Continued)

FOREIGN PATENT DOCUMENTS

CN        1704151 A      12/2005
CN      104226128 B       2/2016
(Continued)

OTHER PUBLICATIONS

Zhu et al., RSC Adv., 2015, vol. 5, pp. 40126-40134. (Year: 2015).*
(Continued)

*Primary Examiner* — Brian Gulledge
(74) *Attorney, Agent, or Firm* — Birch, Stewart, Kolasch & Birch, LLP

(57) ABSTRACT

A composite structure is provided, which includes a support, an active layer wrapping the support, a dendrimer grafted to the active layer through covalent bondings, and a plurality of anti-fouling groups, wherein each of the anti-fouling groups is grafted to terminals of the dendrimer through covalent bondings. The terminals of the dendrimer include amino group, hydroxyl group, or thiol group.

9 Claims, 1 Drawing Sheet

(51) Int. Cl.
*C09D 129/04* (2006.01)
*C09D 171/08* (2006.01)
*B32B 27/36* (2006.01)
*B32B 27/30* (2006.01)
*B32B 27/28* (2006.01)
*C08G 83/00* (2006.01)
*C09D 7/65* (2018.01)
*C09D 201/00* (2006.01)

(52) U.S. Cl.
CPC .......... *B32B 27/302* (2013.01); *B32B 27/304* (2013.01); *B32B 27/308* (2013.01); *B32B 27/36* (2013.01); *C08G 83/003* (2013.01); *C09D 7/65* (2018.01); *C09D 129/04* (2013.01); *C09D 171/08* (2013.01); *C09D 201/005* (2013.01)

(56) References Cited

U.S. PATENT DOCUMENTS

| | | |
|---|---|---|
| 2012/0241373 A1 | 9/2012 | Na et al. |
| 2017/0014776 A1 | 1/2017 | Li et al. |

FOREIGN PATENT DOCUMENTS

| | | |
|---|---|---|
| CN | 105363353 A | 3/2016 |
| CN | 105582820 A | 5/2016 |
| CN | 105709608 A | 6/2016 |
| CN | 205340595 U | 6/2016 |
| JP | 5058102 B2 | 10/2012 |
| JP | 5728278 B2 | 6/2015 |
| TW | 200946568 A | 11/2009 |
| WO | WO 2017/033683 A1 | 3/2017 |

OTHER PUBLICATIONS

Chen et al., Ind. Eng. Chem. Res., 2018, vol. 57, pp. 2322-2328. (Year: 2018).*
Wikipedia listing for "Dendrimer" (Year: 2019).*
Wikipedia listing for "Polyethyleneimine" (Year: 2019).*
Mansourpanah et al., React. Funct. Poly., 2015, vol. 93, pp. 178-189. (Year: 2015).*
Kang et al., "A novel method of surface modification on thin-film composite reverse osmosis membrane by grafting poly(ethylene glycol)," Polymer, vol. 48, 2007 (Available online Jan. 25, 2007), pp. 1165-1170.
McCloskey et al., "A bioinspired fouling-resistant surface modification for water purification membranes," Journal of Membrane Science, vols. 413-414, 2012 (Available online Apr. 21, 2012), pp. 82-90.
Sarkar et al., "Dendrimer-based coatings for surface modification of polyamide reverse osmosis membranes," Journal of Membrane Science, vol. 349, 2010 (Available online Dec. 11, 2009), pp. 421-428.
Sun et al., "Conjugation with Betaine: A Facile and Effective Approach to Significant Improvement of Gene Delivery Properties of PEI," Biomacromolecules, vol. 14, 2013 (Published Feb. 5, 2013), pp. 728-736.
Zhu et al., "Constructing a zwitterionic ultrafiltration membrane surface via multisite anchorage for superior long-term antifouling properties," RSC Advances, vol. 5, 2015, pp. 40126-40134.
Chinese Office Action and Search Report, dated Feb. 3, 2020, for Chinese Application No. 201810188762.7.
Chinese Office Action and Search Report, dated May 7, 2020, for Chinese Application No. 201810188762.7.

* cited by examiner

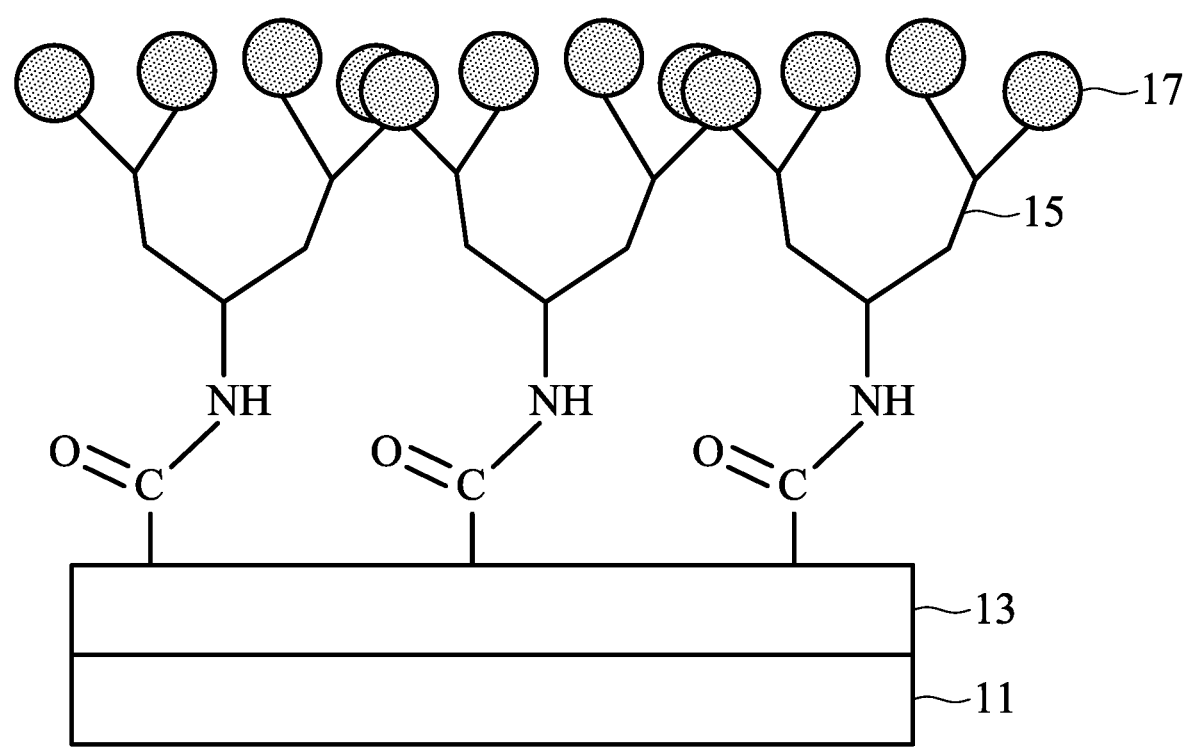

COMPOSITE STRUCTURE

CROSS REFERENCE TO RELATED APPLICATIONS

This application claims the benefit of U.S. Provisional Application No. 62/468,525, filed on Mar. 8, 2017, and claims priority from Taiwan Application Serial Number 106145516, filed on Dec. 25, 2017, the disclosure of which is hereby incorporated by reference herein in its entirety.

TECHNICAL FIELD

The technical field relates to an anti-fouling composite structure, and it relates to the enhancement of the grafting ratio of anti-fouling molecules by dendrimer.

BACKGROUND

Anti-fouling water treatment films, contact lenses that need not be cleaned, anti-fouling fishing tools, long lifespan underwater equipment, ship coating for avoiding barnacle growth, and the like are highly value-added, low energy consumption, and sustainable utilization of resources, thereby being critical in future products. For example, fishing nets in cage aquaculture are dipped in sea water for long time, and halobios easily grow in meshes to increase the weight of the fishing nets. Moreover, the halobios may block the mesh, and the sea water cannot be exchanged through the mesh. As a result, oxygen exchange in water is insufficient, and shellfish on the mesh may cut caught fish. The cut fish can be infected by bacteria and even die.

As such, the functional treatment of anti-fouling is important for underwater equipment. Chemical modification involves grafting or coating anti-fouling molecules to the product surface, thereby increasing the hydrophilicity, hydration abilities, or steric hindrance of the product surface to the pollutants. As such, an anti-fouling effect can be achieved. The anti-fouling materials prepared by surface chemical modification often encounter two main problems. (1) If the anti-fouling molecules are directly grafted onto the product requiring the anti-fouling treatment, the grafting sites on the product surface for modifying the anti-fouling molecules will be limited. As such, the coverage ratio of the grafted anti-fouling material is obviously insufficient, which dramatically affects the anti-fouling ability. (2) If the anti-fouling material is directly coated on the product surface, the coverage ratio of the anti-fouling material can be enhanced. However, the adhesion between the anti-fouling material and the product surface is weak, and the anti-fouling material can easily become peeled by the flow of water and then flow away. On the other hand, some products have a problem wherein the thickness of the anti-fouling coating is too thick, which causes the flow resistance to be too high, lowering the efficiency of the product.

Accordingly, a novel method of grafting a large amount of anti-fouling molecules to the product surface for enhancing the anti-fouling ability of the product is called for.

SUMMARY

One embodiment of the disclosure provides a composite structure, including a support; an active layer wrapping the support; a dendrimer grafted to the active layer through covalent bondings; and a plurality of anti-fouling groups, wherein each of the anti-fouling groups is grafted to terminals of the dendrimer through covalent bondings.

A detailed description is given in the following embodiments with reference to the accompanying drawings.

BRIEF DESCRIPTION OF THE DRAWINGS

The disclosure can be more fully understood by reading the subsequent detailed description and examples with references made to the accompanying drawings, wherein:

FIG. 1 shows a composite structure in one embodiment of the disclosure.

DETAILED DESCRIPTION

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

One embodiment of the disclosure provides a composite structure as shown in FIG. 1, which includes a support 11, an active layer 13 wrapping the support 11, dendrimer 15 grafted to the active layer 13 through covalent bondings, and a plurality of anti-fouling groups 17, wherein each of the anti-fouling groups 17 is grafted to the terminals of the dendrimer 15. The terminals of the dendrimer 15 include amino group, hydroxyl group, or thiol group. In the embodiment shown in FIG. 1, the terminals of the dendrimer 15 are amino groups, which react with acyl chloride groups on the surface of the active layer 13 to form amide bonding. It should be understood that the bonding in FIG. 1 is only for illustration, and the bonding may change according to the terminal groups of the dendrimer 15 and the groups on the surface of the active layer 13. In other words, the bonding between the dendrimer and the active layer is not limited to the amide bonding as shown in FIG. 1. In addition, the dendrimer 15 in FIG. 1 includes five terminal amino groups, but the dendrimer 15 may include dozens of amino groups based on its structure.

In one embodiment, the support 11 includes a non-woven cloth of organic fibers or inorganic fibers, or a composite filtering film formed by a phase transfer process or an electro-spinning process. In one embodiment, the mesh of the composite filtering film has a pore size of 5 nm to 5 µm. Too big pores may break during manufacturing the active layer 13, such that the film may lose the filtering effect. Too small pores cause a flow resistance of the filtering film that is too high, and the water penetration amount is too low.

In one embodiment, the organic fiber includes polycellulose ester, polysulfone, polyether sulfone, polypropylene, polyether ketone, polyester such as polyethylene terephthalate, polyimine, chlorinated polyvinylchloride, polyvinylidene difluoride, or styrene-acrylonitrile copolymer. In one embodiment, the inorganic fibers include carbon fibers, glass fibers, or metal fibers. When the support 11 is the net formed of the above fibers, the composite structure may serve as a filtering film to desalinate and remove the salts in the water.

In one embodiment, the active layer 13 is formed by reacting (a) multi-hydroxyl compound, multi-thiol compound, multi-amine compound, or a combination thereof and (b) multi-acyl halide compound, anhydride compound, multi-carboxylic acid compound, multi-alkene compound, multi-alkyne compound, multi-halide compound, or multi-epoxy compound. In one embodiment, the support 11 can be dipped into an aqueous solution of (a) multi-hydroxyl compound, multi-thiol compound, multi-amine compound, or a combination thereof, such that (a) compound may adhere to the fiber surface in the support 11. In one embodiment, (a) compound in the aqueous solution including (a) compound has a concentration of 0.05 wt % to 5 wt %. Concentration of (a) compound that is too low may result in an interfacial crosslinking layer that is too thin, which causes the product have a poor rigidity and insufficient desalination effect. Concentration of (a) compound that is too high may result in an interfacial crosslinking layer that is too thick, which causes the film have a high flow resistance and a low water production.

Subsequently, the support 11 is dipped into an organic phase solution of (b) multi-acyl halide compound, anhydride compound, multi-carboxylic acid compound, multi-alkene compound, multi-alkyne compound, multi-halide compound, or multi-epoxy compound, such that an interfacial crosslinking reaction of (a) compound and (b) compound is occurred at the interface between the water phase and the organic phase. In one embodiment, (b) compound in the organic phase solution including (b) compound has a concentration of 0.01 wt % to 1 wt %. Concentration of (b) compound that is too low may result in an interfacial crosslinking layer that is too thin, which causes the product have a poor rigidity and insufficient desalination effect. Concentration of (b) compound that is too high may result in an interfacial crosslinking layer that is too thick, which causes the film have a high flow resistance and a low water production. In one embodiment, (a) compound can be piperazine (having two amino groups), and (b) compound can be 1,3,5-benzenetricarboxylic acid chloride (having three acyl chloride groups).

In FIG. 1, the active layer 13 covers the surface of the support 11. However, if the support is a net composed of fibers, the active layer 13 wraps the fiber surface in the support 11. In other words, the active layer 13 wraps parts of the carrier 11 that are in contact with the active layer 13. One function of the active layer is blocking the ions in water to achieve desalination. Another function of the active layer is providing active sites for the dendrimer (modified by the anti-fouling molecules) attaching the surface of the filtering film.

The reaction between (a) Compound and (b) compound may remain some acyl halide, anhydride, carboxylic acid, alkene, alkyne, halide, or epoxy groups to react with the terminal amino, hydroxyl, or thiol groups of the dendrimer 15 to form covalent bondings. In one embodiment, the dendrimer 15 includes polyethyleneimine, polyethyleneimine with terminals modified by hydroxyl groups, polyethyleneimine with terminals modified by thiol groups, polyester, polyester with terminals modified by hydroxyl groups, polyester with terminals modified by thiol groups, polyamide-amine, polyamide-amine with terminals modified by hydroxyl groups, or polyamide-amine with terminals modified by thiol groups, or another suitable dendrimer with terminals of amino, hydroxyl, or thiol groups. In one embodiment, the dendrimer 15 has a weight average molecular weight (Mw) of 100 Da to 100 kDa. An Mw of the dendrimer that is too high may lower the solubility of the dendrimer, such that the modification reaction cannot be performed. An Mw of the dendrimer that is too low may block water channels of the filtering film, such that the filtering flux is lowered.

In one embodiment, the anti-fouling groups 17 include sulfonic acid betaine, carboxylic betaine, phosphate betaine, polyethylene glycol, 2-hydroxyethyl, polyvinyl alcohol, or another suitable anti-fouling group. The structure of the anti-fouling groups 17 may refer to Polymer Journal (2014) 46, 436-443. In one embodiment, the method of grafting the anti-fouling groups 17 to the terminals of the dendrimer 15 is described below. Anti-fouling molecules are selected, in which the anti-fouling groups are bonded to reactive groups such as acrylate, vinyl group, epoxy group, halide, hydroxyl group, or thiol groups. The anti-fouling molecules are mixed and reacted with the dendrimer, such that the terminal (amino, hydroxyl, or thiol groups) of the dendrimer may react with the reactive groups of the anti-fouling molecules through an addition reaction (e.g. the reactive groups of the anti-fouling molecules are acrylate, vinyl, or epoxy groups), a substitution reaction (e.g. the reactive groups of the anti-fouling molecules are halides), a dehydration reaction (the reactive groups of the anti-fouling molecules are hydroxyl groups), or a sweetening reaction (e.g. the reactive groups of the anti-fouling molecules are thiol groups). In one embodiment, the anti-fouling group may have a weight average molecular weight (Mw) of 50 Da to 2000 Da. An Mw of the anti-fouling group that is too high easily results in the aggregation of the reaction product and a poor modification effect. An Mw of the anti-fouling group that is too low may result in a poor anti-fouling effect of the reaction product. In one embodiment, the anti-fouling molecules can be [3-(methacryloylamino)propyl]dimethyl(3-thiolpropyl)ammonium hydroxide or [2-(methacryloyloxy)ethyl]dimethyl-(3-sulfopropyl)ammonium hydroxide. The anti-fouling groups of the above compounds belong to sulfonic acid betaine.

In one embodiment, the anti-fouling molecules can be reacted with the dendrimer 15, and the remaining amino, hydroxyl, or thiol groups of the dendrimer 15 may react with the acyl halide, anhydride, carboxylic acid, alkene, alkyne, halide, or epoxy groups of the active layer 13. In this embodiment, the terminal groups of the dendrimer and the anti-fouling molecules may have a molar ratio of 1:0.1 to 1:0.8. An anti-fouling molecule ratio that is too low may result in insufficient anti-fouling groups on the surface of the final composite structure. An anti-fouling molecule ratio that is too high result in all the terminal groups of the dendrimer being modified by the anti-fouling groups, and no group can remain to react with the acyl halide, anhydride, carboxylic acid, alkene, alkyne, halide, or epoxy groups of the active layer 13. In this embodiment, the dendrimer with terminals modified by the anti-fouling molecules can be added into water to formulate an aqueous solution (0.01 wt % to 5 wt %). The active layer 13 is then dipped into the aqueous solution. A concentration of the dendrimer with terminals modified by the anti-fouling molecules in the aqueous solution that is too low results in the composite structure having a non-obvious anti-fouling effect. A concentration of the dendrimer with terminals modified by the anti-fouling molecules in the aqueous solution that is too high results in a material utilization ratio that is too low. Alternatively, the dendrimer 15 can be reacted with the acyl halide, anhydride, carboxylic acid, alkene, alkyne, halide, or epoxy groups of the active layer 13. The anti-fouling molecules are then reacted with the amino, hydroxyl, or thiol groups of the dendrimer 15.

If the dendrimer 15 is omitted, and the anti-fouling molecules are directly grafted onto the active layer, the grafting amount of the anti-fouling molecules is insufficient, such that the anti-fouling effect of the composite structure cannot be efficiently improved. The embodiments of the disclosure adopt the dendrimer 15 to efficiently increase the grafting amount of the anti-fouling molecules (e.g. the ratio of the anti-fouling groups 17).

Below, exemplary embodiments will be described in detail with reference to accompanying drawings so as to be easily realized by a person having ordinary knowledge in the art. The inventive concept may be embodied in various

EXAMPLES

Comparative Example 1

A filtering material (PES film with a pore size of 5 nm to 5 μm, commercially available from New Micropore, Inc.) was put into an aqueous solution of piperazine (1 wt %) at room temperature for 1 minute, such that fiber surface of the filtering material was wrapped by a layer of piperazine molecules. The excess aqueous solution of piperazine on the filtering material was removed by a roller, and the filtering material was dipped into a hexane solution of 1,3,5-benzenetricarboxylic acid chloride (0.1 wt %) for 1 minute, such that piperazine and 1,3,5-benzenetricarboxylic acid chloride were crosslinked at an interface between aqueous phase and organic phase. As such, an active layer (polyamide) was formed on the filtering material. The above structure was dipped into water, such that the un-reacted acyl chloride groups reacted with water to form carboxylic acid groups. The above structure was air dried for 45 seconds to obtain a filtering material, which had the fiber surface wrapped by the active layer. The surface of the active layer included carboxylic groups.

A formulated aqueous solution was filtered by the filtering film, and the aqueous solution included 2000 ppm of magnesium sulfate and 50 ppm of bovine serum albumin (BSA). The aqueous solution had a flow rate of 1.2 L/minute and both input pressure and output pressure of 100 psi through the filtering film. After filtering for 25 hours, the flux of the filtering film was reduced to 89.48% of the original flux of the filtering film. After filtering for 25 hours, the desalination rate of the filtering film was 96.19%.

Example 1-1

A filtering material (PES film with a pore size of 5 nm to 5 μm, commercially available from New Micropore, Inc.) was put into an aqueous solution of piperazine (1 wt %) at room temperature for 1 minute, such that fiber surface of the filtering material was wrapped by a layer of piperazine molecules. The excess aqueous solution of piperazine on the filtering material was removed by a roller, and the filtering material was dipped into a hexane solution of 1,3,5-benzenetricarboxylic acid chloride (0.1 wt %) for 1 minute, such that piperazine and 1,3,5-benzenetricarboxylic acid chloride were crosslinked at an interface between aqueous phase and organic phase. As such, an active layer was formed on the filtering material. The above structure was air dried for 45 seconds. The surface of the active layer still included un-reacted acyl chloride groups.

In addition, 0.2 g of branched polyethyleneimine (PEI, 408727-100ML commercially available from Sigma-Aldrich, Mw-25 kDa) was selected as a dendrimer. 0.65 g of 2-(methacryloyloxy)ethyl]dimethyl-(3-sulfopropyl)ammonium hydroxide (MEDSA, 537284-50G, commercially available from Sigma-Aldrich) was selected as anti-fouling molecules, which had sulfonic acid betaine group. PEI and MEDSA were added into water, catalyst (0.065 g of $K_2S_2O_8$ and 0.022 g of $Na_2S_2O_5$) were added into water, and the above substances were stirred at 50° C. for 2 hours. The above mixture then was left at room temperature (25° C.) overnight, such that an addition reaction between the terminal amino groups of the dendrimer PEI and the terminal alkene groups of the anti-fouling molecules MEDSA was performed. After the addition reaction, a dendrimer with terminal anti-fouling groups (PEI-MEDSA) was obtained. The above reaction is shown in Formula 1.

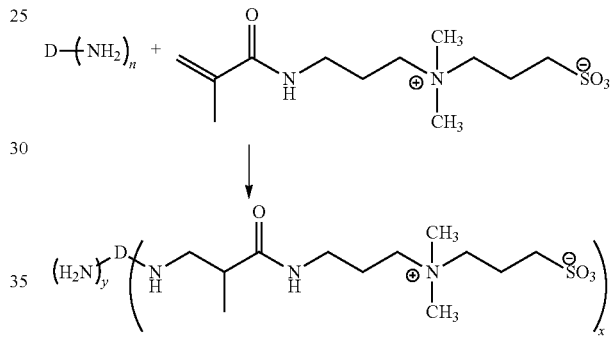

(Formula 1)

In Formula 1, D is the core of PEI, n is the number of terminal amino groups in PEI before the addition reaction, x is the number of MEDSA grafted to PEI, and y is the number of remaining terminal amino groups in PEI after the addition reaction.

Subsequently, the filtering material with fiber surface wrapped by the active layer was dipped into an aqueous solution of PEI-MEDSA (0.2 wt %) for 1 minute, such that the amino groups of PEI-MEDSA reacted with the acyl chloride groups that remained on the active layer. The reaction is shown in Formula 2.

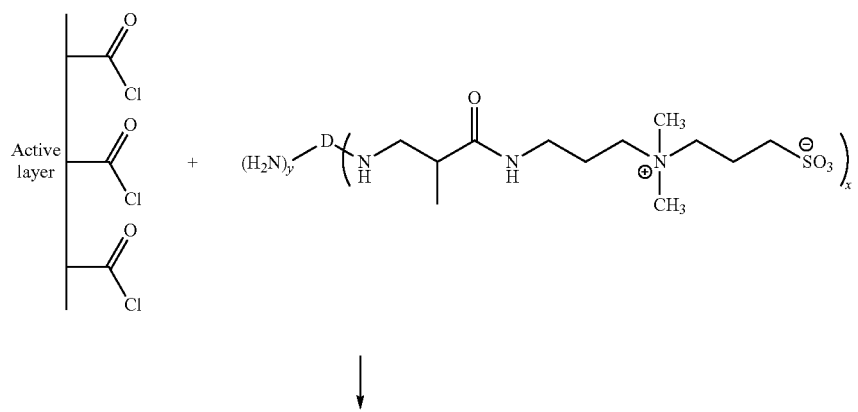

(Formula 2)

-continued

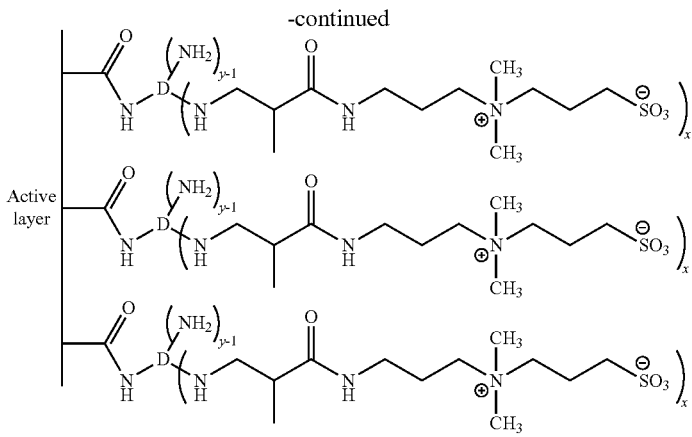

Active layer

If y=1 in Formula 2, no amino group of the dendrimer remained after reacting with the acyl chloride groups of the active layer. The surface of the filtering film was analyzed by X-ray photoelectron spectroscopy (XPS), in which the S atomic % was dramatically increased, thereby ensuring that the above process could graft the dendrimer (including anti-fouling groups) to the surface of the active layer.

A formulated aqueous solution was filtered by the filtering film, and the aqueous solution included 2000 ppm of magnesium sulfate and 50 ppm of BSA. The aqueous solution had a flow rate of 1.2 L/minute and both input pressure and output pressure of 100 psi through the filtering film. After filtering for 25 hours, the flux of the filtering film was reduced to 93.31% of the original flux of the filtering film. Accordingly, the filtering film was stable after a long-term use. After filtering for 25 hours, the desalination rate of the filtering film was 97.44%. Compared to Comparative Example 1, the filtering film in Example 1-1 had a higher stability and desalination rate after long-term use.

Example 1-2

Example 1-2 was similar to Example 1-1, and the difference in Example 1-2 was that the PEI having Mw of 25 k was replaced with another branched PEI having Mw of 800 (408719-100ML, commercially available from Sigma-Aldrich). The other reactions such as the formation of the active layer, the formation of PEI-MEDSA, and reacting the active layer and PEI-MEDSA were similar to those in Example 1-1.

A formulated aqueous solution was filtered by the filtering film, and the aqueous solution included 2000 ppm of magnesium sulfate and 50 ppm of BSA. The aqueous solution had a flow rate of 1.2 L/minute and both input pressure and output pressure of 100 psi through the filtering film. After filtering for 25 hours, the flux of the filtering film was 103.4% of the original flux of the filtering film. Accordingly, the filtering film was stable after a long-term use. After filtering for 25 hours, the desalination rate of the filtering film was 97.81%. Compared to Comparative Example 1, the filtering film in Example 1-2 had a higher stability and desalination rate after long-term use.

Comparative Example 2-1

A filtering material (PES film with a pore size of 5 nm to 5 μm, commercially available from New Micropore, Inc.) was put into an aqueous solution of piperazine (1 wt %) at room temperature for 1 minute, such that fiber surface of the filtering material was wrapped by a layer of piperazine molecules. The excess aqueous solution of piperazine on the filtering material was removed by a roller, and the filtering material was dipped into a hexane solution of 1,3,5-benzenetricarboxylic acid chloride (0.1 wt %) for 1 minute, such that piperazine and 1,3,5-benzenetricarboxylic acid chloride were crosslinked at an interface between aqueous phase and organic phase. As such, an active layer (polyamide) was formed on the filtering material. The above structure was dipped into water, such that the un-reacted acyl chloride groups reacted with water to form carboxylic acid groups. The above structure was air dried for 45 seconds to obtain a filtering material, which had the fiber surface wrapped by the active layer. The surface of the active layer included carboxylic groups.

A formulated aqueous solution was filtered by the filtering film, and the aqueous solution included 2000 ppm of magnesium sulfate and 50 ppm of BSA. The aqueous solution had a flow rate of 1.2 L/minute and both input pressure and output pressure of 100 psi through the filtering film. After filtering for 25 hours, the flux of the filtering film was reduced to 66.7% of the original flux of the filtering film. After filtering for 25 hours, the desalination rate of the filtering film was 97.80%.

Comparative Example 2-2

A filtering material (PES film with a pore size of 5 nm to 5 μm, commercially available from New Micropore, Inc.) was put into an aqueous solution of piperazine (1 wt %) at room temperature for 1 minute, such that fiber surface of the filtering material was wrapped by a layer of piperazine molecules. The excess aqueous solution of piperazine on the filtering material was removed by a roller, and the filtering material was dipped into a hexane solution of 1,3,5-benzenetricarboxylic acid chloride (0.1 wt %) for 1 minute, such that piperazine and 1,3,5-benzenetricarboxylic acid chloride were crosslinked at an interface between aqueous phase and organic phase. As such, an active layer was formed on the filtering material. The above structure was air dried for 45 seconds. The surface of the active layer still included un-reacted acyl chloride groups.

In addition, comb-like copolymer ZWAEM was selected, which had side-chains of anti-fouling groups. The comb-like copolymer ZWAEM was a copolymer of MEDSA and 2-aminoethyl methacrylate hydrochloride (AEM, 516155-5G, commercially available from Sigma-Aldrich). Subsequently, the filtering material with fiber surface wrapped by the active layer was dipped into an aqueous solution of ZWAEM (0.2 wt %) for 3 minutes, such that the amino groups of ZWAEM reacted with the acyl chloride groups that remained on the active layer. The reaction is shown in Formula 3.

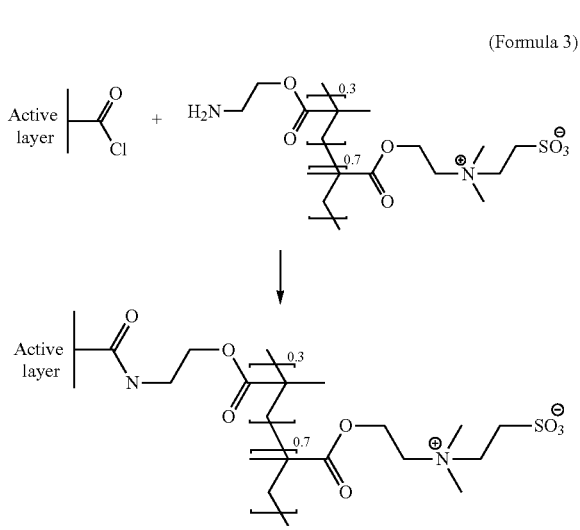

(Formula 3)

The surface of the filtering film was analyzed by XPS, in which the S atomic % was dramatically increased, thereby ensuring that the above process could graft the comb-like copolymer (including anti-fouling groups) to the surface of the active layer. Note that the number of the acyl chloride group that remained on the active layer (e.g. one) in Formula 3 is only for illustration, and the active layer included a plurality of remaining acyl chloride groups in practice.

A formulated aqueous solution was filtered by the filtering film, and the aqueous solution included 2000 ppm of magnesium sulfate and 50 ppm of BSA. The aqueous solution had a flow rate of 1.2 L/minute and both input pressure and output pressure of 100 psi through the filtering film. After filtering for 25 hours, the flux of the filtering film was dramatically reduced to 53.80% of the original flux of the filtering film. After filtering for 25 hours, the desalination rate of the filtering film was 96.98%.

Example 2-1

A filtering material (PES film with a pore size of 5 nm to 5 μm, commercially available from New Micropore, Inc.) was put into an aqueous solution of piperazine (1 wt %) at room temperature for 1 minute, such that fiber surface of the filtering material was wrapped by a layer of piperazine molecules. The excess aqueous solution of piperazine on the filtering material was removed by a roller, and the filtering material was dipped into a hexane solution of 1,3,5-benzenetricarboxylic acid chloride (0.1 wt %) for 1 minute, such that piperazine and 1,3,5-benzenetricarboxylic acid chloride were crosslinked at an interface between aqueous phase and organic phase. As such, an active layer was formed on the filtering material. The above structure was air dried for 45 seconds. The surface of the active layer still included un-reacted acyl chloride groups.

In addition, 0.2 g of branched polyethyleneimine (PEI, 408727-100ML commercially available from Sigma-Aldrich, Mw~25 kDa) was selected as a dendrimer. 0.65 g of MEDSA was selected as anti-fouling molecules, which had sulfonic acid betaine group. PEI and MEDSA were added into water, catalyst (0.065 g of $K_2S_2O_8$ and 0.022 g of $Na_2S_2O_5$) were added into water, and the above substances were stirred at 50° C. for 2 hours. The above mixture was then left at room temperature (25° C.) overnight, such that an addition reaction between the terminal amino groups of the dendrimer PEI and the terminal alkene groups of the anti-fouling molecules MEDSA was performed. After the addition reaction, a dendrimer with terminal anti-fouling groups (PEI-MEDSA) was obtained. The above reaction is shown in Formula 4.

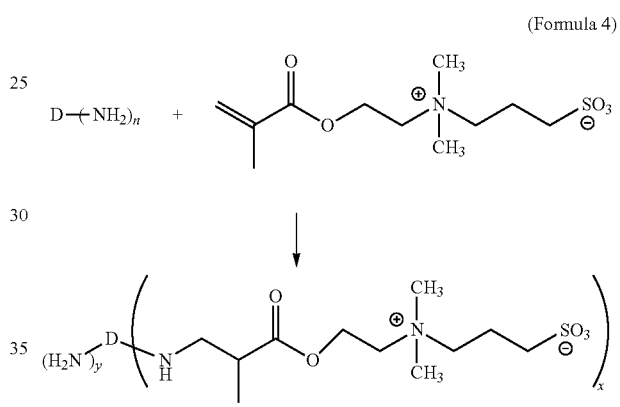

(Formula 4)

In Formula 4, D is the core of PEI, n is the number of terminal amino groups in PEI before the addition reaction, x is the number of MEDSA grafted to PEI, and y is the number of the remaining terminal amino groups in PEI after the addition reaction.

Subsequently, the filtering material with fiber surface wrapped by the active layer was dipped into an aqueous solution of PEI-MEDSA (0.2 wt %) for 1 minute, such that the amino groups of PEI-MEDSA reacted with the acyl chloride groups remained on the active layer. The reaction is shown in Formula 5.

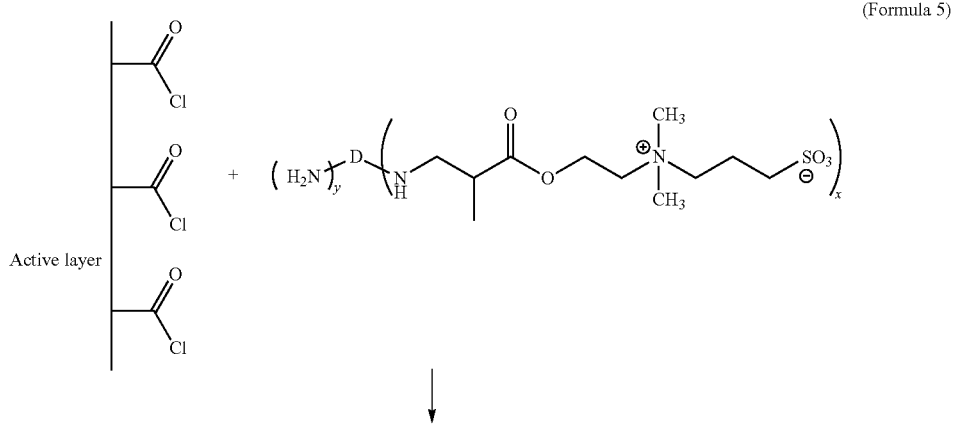

(Formula 5)

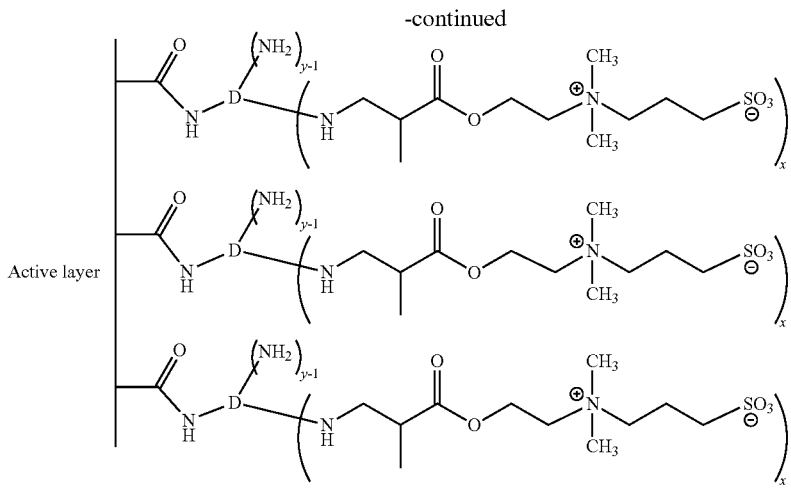

If y=1 in Formula 5, no amino group of the dendrimer remained after reacting with the acyl chloride groups of the active layer. The surface of the filtering film was analyzed by XPS, in which the S atomic % was dramatically increased, thereby ensuring that the above process could graft the dendrimer (including anti-fouling groups) to the surface of the active layer.

A formulated aqueous solution was filtered by the filtering film, and the aqueous solution included 2000 ppm of magnesium sulfate and 50 ppm of BSA. The aqueous solution had a flow rate of 1.2 L/minute and both input pressure and output pressure of 100 psi through the filtering film. After filtering for 25 hours, the flux of the filtering film was 82.7% of the original flux of the filtering film. Accordingly, the filtering film was stable after long-term use. After filtering for 25 hours, the desalination rate of the filtering film was 97.45%. Compared to Comparative Example 2-1, the filtering film in Example 2-1 had a higher stability and a similar desalination rate after long-term use. Compared to Comparative Example 2-2, the filtering film in Example 2-1 had higher stability and desalination rate after long-term use.

Example 2-2

A filtering material (PES film with a pore size of 5 nm to 5 μm, commercially available from New Micropore, Inc.) was put into an aqueous solution of piperazine (1 wt %) at room temperature for 1 minute, such that fiber surface of the filtering material was wrapped by a layer of piperazine molecules. The excess aqueous solution of piperazine on the filtering material was removed by a roller, and the filtering material was dipped into a hexane solution of 1,3,5-benzenetricarboxylic acid chloride (0.1 wt %) for 1 minute, such that piperazine and 1,3,5-benzenetricarboxylic acid chloride were crosslinked at an interface between aqueous phase and organic phase. As such, an active layer was formed on the filtering material. The above structure was air dried for 45 seconds. The surface of the active layer still included un-reacted acyl chloride groups.

In addition, 0.2 g of branched polyethyleneimine (PEI, 408727-100ML commercially available from Sigma-Aldrich, Mw~25 kDa) was selected as a dendrimer. The dendrimer was dissolved in water. Subsequently, the filtering material with fiber surface wrapped by the active layer was dipped into an aqueous solution of PEI (0.2 wt %) for 3 minutes, such that the amino groups of PEI reacted with the acyl chloride groups that remained on the active layer. The reaction is shown in Formula 6.

(Formula 6)

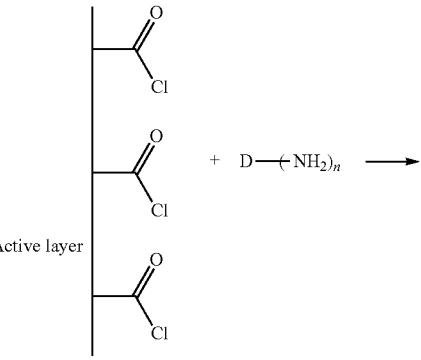

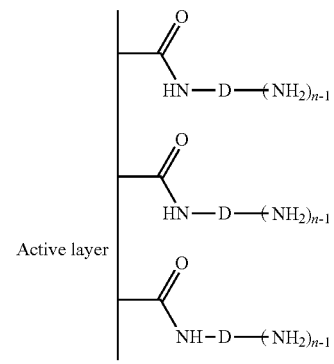

Subsequently, 0.65 g of MEDSA was selected as anti-fouling molecules. The anti-fouling molecules and catalyst (0.065 g of $K_2S_2O_8$ and 0.022 g of $Na_2S_2O_5$) were added into the above solution. The solution was then heated to 50° C. to react for 30 minutes, such that an addition reaction between the terminal amino groups of the dendrimer and the terminal alkene groups of the anti-fouling molecules was performed. After the addition reaction, a product similar to that in Formula 5 was obtained, and the related descriptions are not repeated here.

The difference between Example 2-2 and Example 2-1 was that the dendrimer PEI was grafted to the surface of the active layer, and the anti-fouling molecules were then grafted to the terminals of the dendrimer. Compared to Example 2-1, the method of modifying the filtering film in Example 2-2 took more time. However, the properties of the filtering film in Example 2-2, e.g. the stability and desalination rate, were similar to the properties of the filtering film in Example 2-1.

Example 3 (AF1 and AF2)

A filtering material (PES film with a pore size of 5 nm to 5 μm, commercially available from New Micropore, Inc.) was put into an aqueous solution of piperazine (1 wt %) at room temperature for 1 minute, such that fiber surface of the filtering material was wrapped by a layer of piperazine molecules. The excess aqueous solution of piperazine on the filtering material was removed by a roller, and the filtering material was dipped into a hexane solution of 1,3,5-benzenetricarboxylic acid chloride (0.1 wt %) for 1 minute, such that piperazine and 1,3,5-benzenetricarboxylic acid chloride were crosslinked at an interface between aqueous phase and organic phase. As such, an active layer was formed on the filtering material. The above structure was air dried for 45 seconds. The surface of the active layer still included un-reacted acyl chloride groups.

The anti-fouling material of the filtering film AF1 was synthesized as below. 13.4 g of branched polyethyleneimine PEI (408719-100ML, commercially available from Sigma-Aldrich, Mw~800 Da) was selected as a dendrimer. 14 g of MEDSA was selected as anti-fouling molecules, which had sulfonic acid betaine group. PEI and MEDSA were added into water, and catalyst $(NH_4)_2Ce(NO_3)_6$ (3 mol %) was added into water to react for 3 hours, such that an addition reaction between the terminal amino groups of the dendrimer and the terminal alkene groups of the anti-fouling molecules was performed. The precipitate of the reaction result was then removed by filtering. Subsequently, the filtering material with fiber surface wrapped by the active layer was dipped into an aqueous solution of PEI-MEDSA (0.2 wt %) for 3 minutes, such that the amino groups of PEI reacted with the acyl chloride groups that remained on the active layer.

The anti-fouling material of the filtering film AF2 was the comb-like copolymer ZWAEM, which was formed by copolymerizing MEDSA and AEM. The chemical structure of ZWAEM is shown in Formula 7.

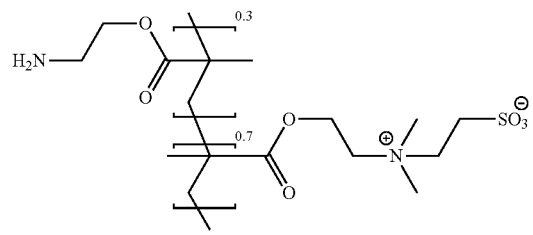

(Formula 7)

Subsequently, the filtering material with fiber surface wrapped by the active layer was dipped into a solution of ZWAEM (0.2 wt %) for 3 minutes, such that the amino groups of ZWAEM reacted with the acyl chloride groups that remained on the active layer.

In Example 3, the filtering area of the filtering films AF1 and AF2 was increased from 50 $cm^2$ of the original filtering material (with fiber surface wrapped by the active layer) to 0.39 $m^2$ (increased about 78 times).

A formulated aqueous solution was respectively filtered by the filtering films, and the aqueous solution included 2000 ppm of magnesium sulfate and 1000 ppm of BSA. The aqueous solution had a flow rate of 1.2 L/minute and both input pressure and output pressure of 100 psi through the filtering film. After filtering for 80 hours, the flux of the filtering film AF1 was 91.44% of the original flux of the filtering film AF1. Accordingly, the filtering film AF1 was stable after long-term use. After filtering for 80 hours, the conductivity of the water filtered by the filtering film AF1 was reduced to 46 μS/cm. After filtering for 80 hours, the flux of the filtering film with fiber surface wrapped by the active layer was 87.55% of the original flux of the filtering film with fiber surface wrapped by the active layer. After filtering for 80 hours, the flux of the filtering film AF2 was 87.51% of the original flux of the filtering film AF2. Compared to the filtering film AF2, the filtering film AF1 had higher stability and desalination rate after long-term use.

Example 4

A filtering material (PES film with a pore size of 5 nm to 5 μm, commercially available from New Micropore, Inc.) was put into an aqueous solution of piperazine (1 wt %) at room temperature for 1 minute, such that fiber surface of the filtering material was wrapped by a layer of piperazine molecules. The excess aqueous solution of piperazine on the filtering material was removed by a roller, and the filtering material was dipped into a hexane solution of 1,3,5-benzenetricarboxylic acid chloride (0.15 wt %) for 1 minute, such that piperazine and 1,3,5-benzenetricarboxylic acid chloride were crosslinked at an interface between aqueous phase and organic phase. As such, an active layer was formed on the filtering material. The above structure was air dried for 45 seconds. The surface of the active layer included unreacted acyl chloride groups.

In addition, 6.7 g of branched polyethyleneimine (PEI, 408727-100ML commercially available from Sigma-Aldrich, Mw~25 kDa) was selected as a dendrimer. 12.5 g of poly(ethylene glycol) methacrylate (PEGMA, 409529-100ML, commercially available from Sigma-Aldrich, Mn~500 Da) was selected as anti-fouling molecules, which had hydroxyl group. PEI and PEGMA were added into water, catalyst (842 mg of $(NH_4)_2Ce(NO_3)_6$) was added into water, and the above substances were stirred at 50° C. for 3 hours, such that an addition reaction between the terminal amino groups of the dendrimer PEI and the terminal alkene groups of the anti-fouling molecules PEGMA was performed. After the addition reaction, a solution of a dendrimer with terminal anti-fouling groups (PEI-PEG) was obtained. After the reaction, some precipitation was formed. The precipitation was removed to obtain an anti-fouling molecule solution.

Subsequently, the filtering material with fiber surface wrapped by the active layer was dipped into the aqueous solution of PEI-PEG (0.2 wt %) for 1 minute, such that the amino groups of PEI-PEG reacted with the acyl chloride groups remained on the active layer for grafting the dendrimer with the anti-fouling groups onto the surface of the active layer. The PEI-PEG is illustrated as below:

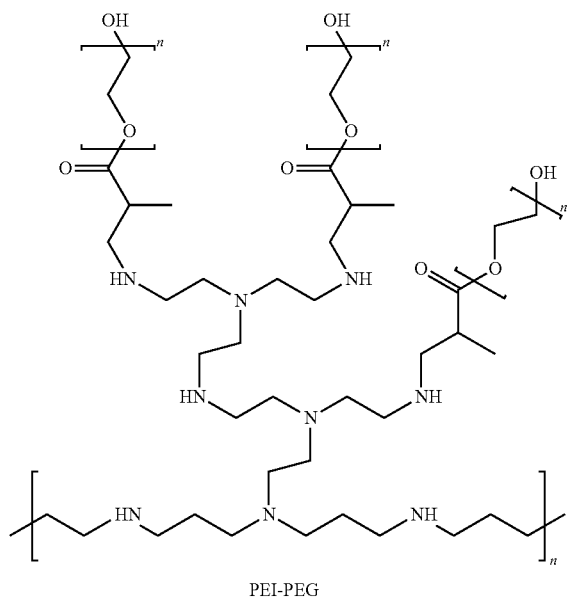

PEI-PEG

A formulated aqueous solution was filtered by the filtering film, and the aqueous solution included 2000 ppm of magnesium sulfate and 50 ppm of BSA. The aqueous solution had a flow rate of 1.2 L/minute and both input pressure and output pressure of 100 psi through the filtering film. After filtering for 25 hours, the flux of the filtering film was 79.32% of the original flux of the filtering film. Accordingly, the filtering film was stable after long-term use. After filtering for 25 hours, the desalination rate of the filtering film was 98.00%. After filtering for 25 hours, the flux of the original filtering film without modification was 66.56% of the original flux of the filtering film. After filtering for 25 hours, the desalination rate of the original filtering film without modification was 97.59%. Compared to the original filtering film without the modification, the filtering film in Example 4 had a higher stability and desalination rate after long-term use.

Example 5

A filtering material (PES film with a pore size of 5 nm to 5 μm, commercially available from New Micropore, Inc.) was put into an aqueous solution of piperazine (1 wt %) at room temperature for 1 minute, such that fiber surface of the filtering material was wrapped by a layer of piperazine molecules. The excess aqueous solution of piperazine on the filtering material was removed by a roller, and the filtering material was dipped into a hexane solution of 1,3,5-benzenetricarboxylic acid chloride (0.15 wt %) for 1 minute, such that piperazine and 1,3,5-benzenetricarboxylic acid chloride were crosslinked at an interface between aqueous phase and organic phase. As such, an active layer was formed on the filtering material. The above structure was air dried for 45 seconds. The surface of the active layer included unreacted acyl chloride groups.

In addition, 1 g of hyper-branched BIS-MPA polyester-64-hydroxyl, G4 (HBP-OH, 686573-10G commercially available from Sigma-Aldrich) was selected as a dendrimer and dissolved in 100 mL of methanol. Subsequently, the filtering material with fiber surface wrapped by the active layer was dipped into the solution of HBP-OH (1 wt %) for 3 minutes, such that the hydroxyl groups of HBP-OH reacted with the acyl chloride groups remained on the active layer.

Thereafter, 1 g of acrylyl chloride was dissolved in hexane to form a solution (1 wt %). The filtering film was dipped into the hexane solution, such that the hydroxyl groups of the dendrimer reacted with the acyl chloride to form alkene groups on the terminals of the dendrimer. The filtering film was then dipped into an aqueous solution of anti-fouling molecules MEDSA (8 wt %), catalyst (0.4 g of $K_2S_2O_8$ and 0.1 g of $Na_2S_2O_5$) was added into the MEDSA solution, and then stirred at 50° C. for 16 hours, such that an addition reaction between the terminal alkene groups of the dendrimer and the terminal alkene groups of the anti-fouling molecules was performed. After the addition reaction, a solution of a dendrimer with terminal anti-fouling groups (HBP-OH-MEDSA) was obtained. After the reaction, some precipitation was formed. The precipitation was removed to obtain an anti-fouling molecule solution. The surface of the filtering film was analyzed by XPS, in which the S atomic % was dramatically increased, thereby ensuring that the above process could graft the dendrimer (including anti-fouling groups) to the surface of the active layer. HBP-OH-MEDSA is illustrated as below:

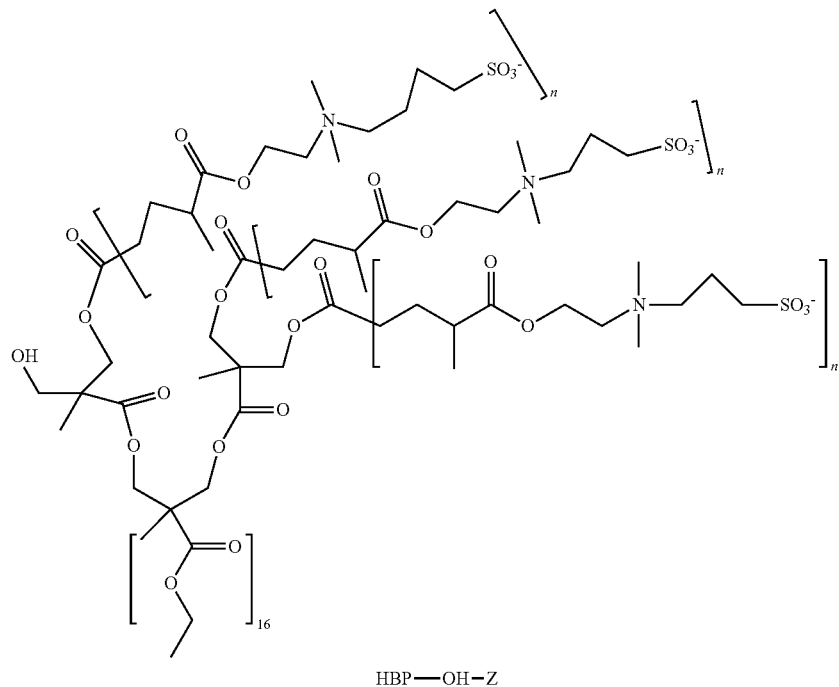

HBP—OH—Z

A formulated aqueous solution was filtered by the filtering film, and the aqueous solution included 2000 ppm of magnesium sulfate and 50 ppm of BSA. The aqueous solution had a flow rate of 1.2 L/minute and both input pressure and output pressure of 100 psi through the filtering film. After filtering for 25 hours, the flux of the filtering film was 89.50% of the original flux of the filtering film. Accordingly, the filtering film was stable after long-term use. After filtering for 25 hours, the desalination rate of the filtering film was 98.78%. After filtering for 25 hours, the flux of the original filtering film without modification was 60.05% of the original flux of the filtering film. After filtering for 25 hours, the desalination rate of the original filtering film without modification was 97.92%. Compared to the original filtering film without the modification, the filtering film in Example 5 had a higher stability and desalination rate after long-term use.

Example 6

A filtering material (PES film with a pore size of 5 nm to 5 μm, commercially available from New Micropore, Inc.) was put into an aqueous solution of piperazine (1 wt %) at room temperature for 1 minute, such that fiber surface of the filtering material was wrapped by a layer of piperazine molecules. The excess aqueous solution of piperazine on the filtering material was removed by a roller, and the filtering material was dipped into a hexane solution of 1,3,5-benzenetricarboxylic acid chloride (0.15 wt %) for 1 minute, such that piperazine and 1,3,5-benzenetricarboxylic acid chloride were crosslinked at an interface between aqueous phase and organic phase. As such, an active layer was formed on the filtering material. The above structure was air dried for 45 seconds. The surface of the active layer included unreacted acyl chloride groups.

3.82 g of MEDSA was selected as anti-fouling molecules and dissolved in 10 mL of water. 1 g of tris(2-aminoethyl) amine (TAEA, 225630-10ML commercially available from Sigma-Aldrich) was selected as a dendrimer to be added into the aqueous solution of MEDSA and evenly stirred for 2 minutes. Catalyst (224.8 mg of $(NH_4)_2Ce(NO_3)_6$) was added into the above substances, and then stirred at 50° C. for 3 hours, such that an addition reaction between the terminal amino groups of the dendrimer and the terminal alkene groups of the anti-fouling molecules was performed. After the addition reaction, a solution of a dendrimer with terminal anti-fouling groups (TAEA-MEDSA) was obtained. After the reaction, some precipitation was formed. The precipitation was removed to obtain an anti-fouling molecule solution.

Subsequently, the filtering material with fiber surface wrapped by the active layer was dipped into the aqueous solution of TAEA-MEDSA (0.2 wt %) for 1 minute, such that the amino groups of TAEA-MEDSA reacted with the acyl chloride groups remained on the active layer for grafting the dendrimer with the anti-fouling groups onto the surface of the active layer. TAEA-MEDSA is illustrated as below:

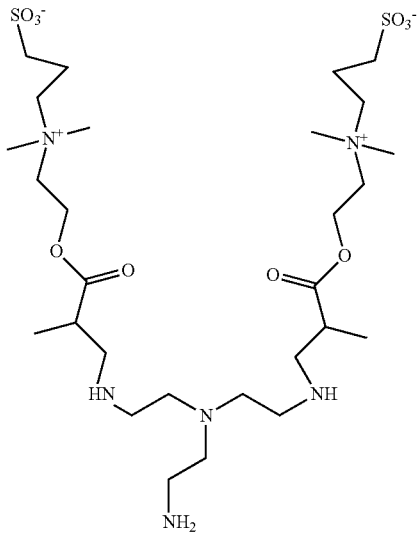

A formulated aqueous solution was filtered by the filtering film, and the aqueous solution included 2000 ppm of magnesium sulfate and 50 ppm of BSA. The aqueous solution had a flow rate of 1.2 L/minute and both input pressure and output pressure of 100 psi through the filtering film. After filtering for 25 hours, the flux of the filtering film was 97.96% of the original flux of the filtering film. Accordingly, the filtering film was stable after long-term use. After filtering for 25 hours, the desalination rate of the filtering film was 98.77%. After filtering for 25 hours, the flux of the original filtering film without modification was 77.98% of the original flux of the filtering film. After filtering for 25 hours, the desalination rate of the original filtering film without modification was 99.08%. Compared to the original filtering film without the modification, the filtering film in Example 6 had a higher stability after long-term use, and the desalination rate thereof was slightly changed.

Example 7

A filtering material (PES film with a pore size of 5 nm to 5 μm, commercially available from New Micropore, Inc.) was put into an aqueous solution of piperazine (1 wt %) at room temperature for 1 minute, such that fiber surface of the filtering material was wrapped by a layer of piperazine molecules. The excess aqueous solution of piperazine on the filtering material was removed by a roller, and the filtering material was dipped into a hexane solution of 1,3,5-benzenetricarboxylic acid chloride (0.15 wt %) for 1 minute, such that piperazine and 1,3,5-benzenetricarboxylic acid chloride were crosslinked at an interface between aqueous phase and organic phase. As such, an active layer was formed on the filtering material. The above structure was air dried for 45 seconds. The surface of the active layer included unreacted acyl chloride groups.

In addition, 1 g of PEI (408727-100ML commercially available from Sigma-Aldrich, Mw~25 kDa) was selected as a dendrimer. Subsequently, the filtering material with fiber surface wrapped by the active layer was dipped into the aqueous solution of PEI (0.2 wt %) for 3 minutes, such that the hydroxyl groups of PEI reacted with the acyl chloride groups remained on the active layer.

Subsequently, 7 g of poly(ethylene glycol) diacrylate (PEGDA, 455008-100ML commercially available from Sigma-Aldrich, Mn~700 Da) was dissolved in 50 mL of water to prepare an aqueous solution (14 wt %). The filtering film was dipped into the aqueous solution of PEGDA, catalyst (164 mg of $(NH_4)_2Ce(NO_3)_6$) was added into the above substances to react for 30 minutes, such that an addition reaction between the terminal amino groups of the dendrimer PEI and the terminal alkene groups of PEGDA was performed for forming alkene groups on the terminals of the dendrimer. The filtering film was then taken out, and the surface of the filtering film was cleaned by de-ionized water. The filtering film was then dipped into an aqueous solution of anti-fouling molecules MEDSA (16 wt %), catalyst (0.8 g of $K_2S_2O_8$ and 0.26 g of $Na_2S_2O_5$) was added into the MEDSA solution, and then stirred at 50° C. for 30 minutes, such that an addition reaction between the terminal alkene groups of the dendrimer and the terminal alkene groups of the anti-fouling molecules was performed. After the addition reaction, a dendrimer with terminal anti-fouling groups (PEI-PEGDA-MEDSA) was obtained. PEI-PEGDA-MEDSA is illustrated as below:

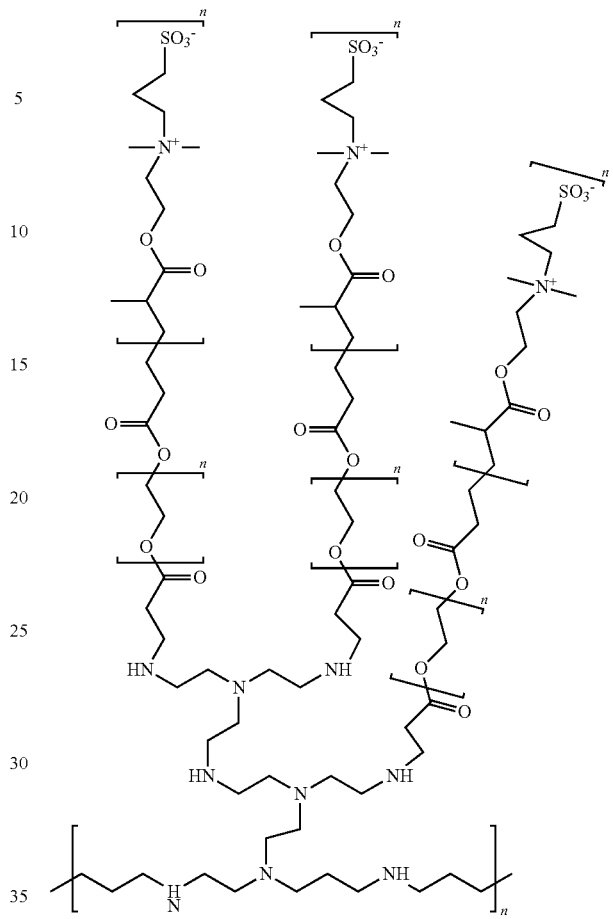

A formulated aqueous solution was filtered by the filtering film, and the aqueous solution included 2000 ppm of magnesium sulfate and 50 ppm of BSA. The aqueous solution had a flow rate of 1.2 L/minute and both input pressure and output pressure of 100 psi through the filtering film. After filtering for 25 hours, the flux of the filtering film was 94.34% of the original flux of the filtering film. Accordingly, the filtering film was stable after long-term use. After filtering for 25 hours, the desalination rate of the filtering film was 98.85%. After filtering for 25 hours, the flux of the original filtering film without modification was 77.98% of the original flux of the filtering film. After filtering for 25 hours, the desalination rate of the original filtering film without modification was 99.08%. Compared to the original filtering film without the modification, the filtering film in Example 7 had a higher stability after long-term use, and the desalination rate thereof was slightly changed.

It will be apparent to those skilled in the art that various modifications and variations can be made to the disclosed methods and materials. It is intended that the specification and examples be considered as exemplary only, with the true scope of the disclosure being indicated by the following claims and their equivalents.

What is claimed is:
1. A composite structure, comprising:
   a support;
   a polyamide active layer wrapping the support, wherein the polyamide active layer is formed by reacting piperazine and 1,3,5-benzenetricarboxylic acid chloride;

a dendrimer and/or branched polymer grafted to the polyamide active layer through covalent bondings; and a plurality of anti-fouling groups, wherein each of the anti-fouling groups is grafted to terminals of the dendrimer and/or branched polymer through covalent bondings.

2. The composite structure as claimed in claim 1, wherein the support comprises a non-woven cloth of organic fibers or inorganic fibers.

3. The composite structure as claimed in claim 2, wherein the organic fibers comprise polycellulose ester, polysulfone, polyether sulfone, polypropylene, polyether ketone, polyester, polyimide, chlorinated polyvinylchloride, polyvinylidene difluoride, or styrene-acrylonitrile copolymer.

4. The composite structure as claimed in claim 2, wherein the inorganic fibers comprise carbon fibers, glass fibers, or metal fibers.

5. The composite structure as claimed in claim 1, wherein the terminals of the dendrimer and/or branched polymer include amino group, hydroxyl group, or thiol group.

6. The composite structure as claimed in claim 1, wherein the dendrimer and/or branched polymer includes polyethyleneimine, polyethyleneimine with terminals modified by hydroxyl groups, polyethyleneimine with terminals modified by thiol groups, polyester, polyester with terminals modified by hydroxyl groups, polyester with terminals modified by thiol groups, polyamide-amine, polyamide-amine with terminals modified by hydroxyl groups, or polyamide-amine with terminals modified by thiol groups.

7. The composite structure as claimed in claim 1, wherein the dendrimer and/or branched polymer has a weight average molecular weight of 100 Da to 100 kDa.

8. The composite structure as claimed in claim 1, wherein the anti-fouling groups comprise sulfonic acid betaine, carboxylic betaine, phosphate betaine, polyethylene glycol, 2-hydroxyethyl, or polyvinyl alcohol.

9. The composite structure as claimed in claim 1, wherein the anti-fouling groups have a weight average molecular weight of 50 Da to 2000 Da.

* * * * *